United States Patent [19]

Gyugyi

[11] Patent Number: 5,698,969
[45] Date of Patent: Dec. 16, 1997

[54] APPARATUS AND METHOD FOR INTERLINE POWER FLOW CONTROL

[75] Inventor: Laszlo Gyugyi, Penn Hills Township, Pa.

[73] Assignee: Westinghouse Electric Corporation, Pittsburgh, Pa.

[21] Appl. No.: 564,535

[22] Filed: Nov. 29, 1995

[51] Int. Cl.$^6$ .................................................. G05F 1/70
[52] U.S. Cl. .................................. 323/207; 323/215
[58] Field of Search ............................... 323/205, 207, 323/212, 215, 217; 363/34, 35, 36, 37, 51

[56] References Cited

U.S. PATENT DOCUMENTS

| | | | |
|---|---|---|---|
| 4,173,780 | 11/1979 | Hausler | 363/51 |
| 4,307,442 | 12/1981 | Yano et al. | 363/51 |
| 4,429,357 | 1/1984 | Hausler | 363/68 |
| 5,166,597 | 11/1992 | Larsen et al. | 323/215 |
| 5,198,746 | 3/1993 | Gyugyi et al. | 323/207 |
| 5,343,139 | 8/1994 | Gyugyi et al. | 323/207 |
| 5,469,044 | 11/1995 | Gyugyi | 323/207 |
| 5,535,113 | 7/1996 | Konishi | 363/35 |

*Primary Examiner*—Matthew V. Nguyen
*Attorney, Agent, or Firm*—R. P. Lenart

[57] ABSTRACT

An apparatus and method are disclosed for controlling the power flow in an electric transmission system including at least two transmission lines, each transmission line having two ends and carrying alternating current at a selected transmission line voltage and fundamental frequency between the ends. At least two alternating voltages at the fundamental frequency of the alternating currents flowing in the transmission lines, with variable magnitude and controllable phase angle relative to the transmission line current, are generated and coupled in series with the transmission lines. The magnitude and phase of each generated voltage are controlled selectively and individually to adjust the effective reactive and real impedance of each transmission line, to control the real power transmitted between the two ends of the transmission line and, concurrently, to control the amount of real power individually transferred between the transmission lines.

20 Claims, 6 Drawing Sheets

FIG. 7

APPARATUS AND METHOD FOR INTERLINE POWER FLOW CONTROL

BACKGROUND OF THE INVENTION

This invention relates to apparatus and methods for controlling the flow of electric power on an ac transmission line, and in particular, to a power flow controller and control method which can provide series reactive power compensation for individual transmission lines and, at the same time, can transfer real power between these lines.

Electric power flow through an ac transmission line is a function of the line impedance, the magnitude of the sending end and receiving end voltages, and the phase angle between these voltages. The power flow in an individual transmission line is traditionally controlled either by reactive series compensation, using fixed or thyristor-controlled series capacitors, or by phase shifting transformers. Recently, new power controllers using solid state switching converters, have been proposed. U.S. Pat. No. 5,198,746 entitled "Transmission Line Dynamic Impedance Compensation System", describes an apparatus that is able to inject a controlled voltage in quadrature with the transmission line current and thereby accomplish the control of reactive line impedance and transmitted power. U.S. Pat. No. 5,343,139 entitled "Generalized Fast Flow Power Controller" describes an apparatus that, by appropriate voltage injection, is able to control, concurrently or selectively, the transmission line impedance, voltage and phase angle, and thereby the transmitted power. Commonly assigned U.S. patent application Ser. No. 08/366,649, filed Dec. 30, 1994, and entitled "Series Compensator Inserting Real And Reactive Impedance Into Electric Power System For Damping Power Oscillations" describes an improved method of series compensation which controls reactive line impedance by the injection of a voltage in quadrature with the line current, in a manner similar to that described in U.S. Pat. No. 5,198,746, and in addition, by the use of an external energy storage, it can also insert a voltage component in phase with the line current to establish temporarily a virtual positive or negative real impedance in series with the line, for the purpose of aiding power oscillation damping.

The common feature of all of these power flow controllers, independently of whether they employ conventional or electronic devices, is that they can directly control the power flow only in a single line to which they are coupled. However, several transmission lines are usually connected to a voltage bus. The other end of the lines may be connected to another common voltage bus, or to different busses, depending on the structure of the transmission network. The lines may have similar or different impedances. Thus, it is easy to see that the control of power flow in one line of a network may not provide an optimal solution for the economic utilization of the whole network. For example, in a multi-line transmission line arrangement, if one line is overloaded and another is under loaded, the ideal solution would be to increase the transmitted power in the under loaded line and decrease it in the overloaded line, with as little impact as possible on the power flow of the other lines. A state-of-the-art power flow controller is able to increase or decrease the power flow only in one line and the change in that line may impact the power flow in all other lines. Thus, real power burden cannot be directly transferred from one specific line to another but changed indirectly in each line by individual power flow controllers until the desired flow levels are established.

SUMMARY OF THE INVENTION

This invention is embodied in an Interline Power Flow Controller (IPFC) which is able to control the transmitted power over an individual line by the method of series voltage injection, but in addition, it is also able to transfer a defined amount of power from one specific line to one or more other lines. The IPFC controls power flow by means of reactive series compensation of individual lines and by simultaneous, controlled real power transfer between these lines.

A power flow controller constructed in accordance with this invention controls the power flow in an electric transmission system including at least two transmission lines, each transmission line having two ends and carrying alternating current at a selected transmission line voltage and fundamental frequency between the ends. The controller includes a converter for generating at least two alternating voltages at the fundamental frequency of the alternating currents flowing in the transmission lines with variable magnitude and controllable phase angle relative to the transmission line current; each generated voltage is individually coupled in series with one of the transmission lines; and a control device controls the magnitude and phase of each generated voltage in order to selectively and individually adjust the effective reactive and real impedance of the each transmission line to control the real power transmitted between the two ends of the transmission line and, concurrently, to control the amount of real power individually transferred between the transmission lines through the converter.

This invention also encompasses a method for controlling the power flow in an electric transmission system including at least two transmission lines, each transmission line having two ends and carrying alternating current at a selected transmission line voltage and fundamental frequency between the ends. The method comprises the steps of: generating at least two alternating voltages at the fundamental frequency of the alternating currents flowing in the transmission lines with variable magnitude and controllable phase angle relative to the transmission line current; coupling individually each generated voltage in series with one of the transmission lines; and controlling the magnitude and phase of each generated voltage to selectively and individually adjust the effective reactive and real impedance of the each transmission line to control the real power transmitted between the two ends of the transmission line and, concurrently, to control the amount of real power individually transferred between the transmission lines.

DESCRIPTION OF THE PREFERRED EMBODIMENTS

Figure 1:
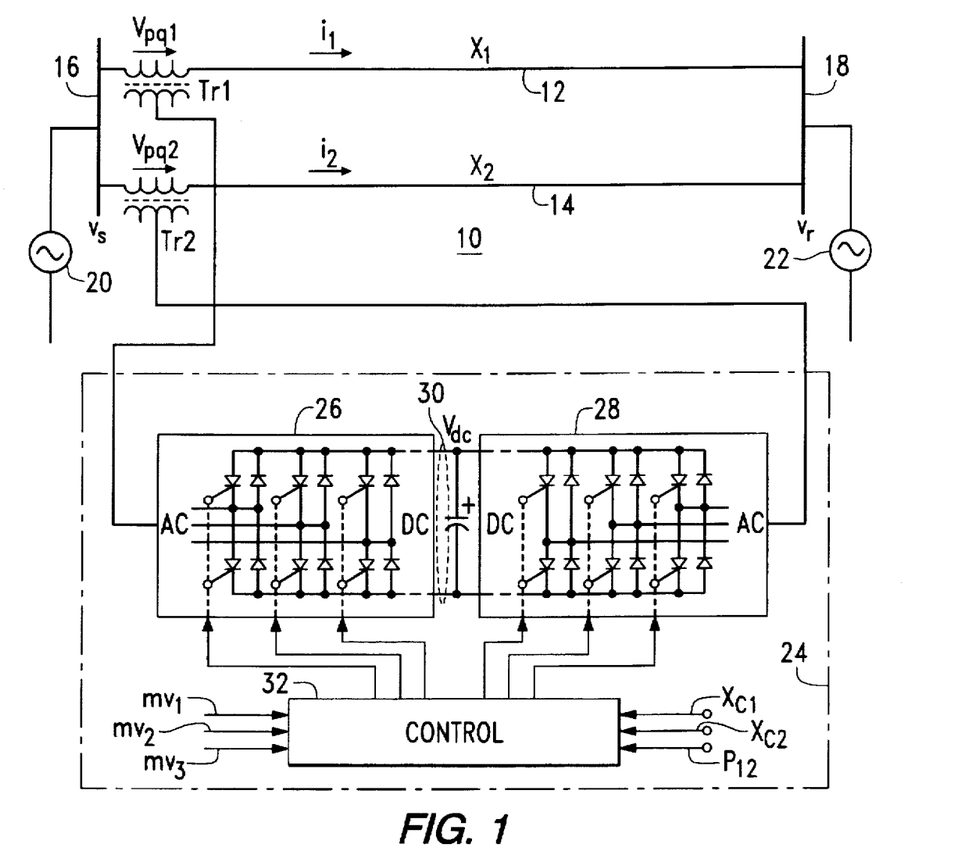
FIG. 1 is a simplified diagram of an interline power flow controller constructed in accordance with one embodiment of the invention.

Referring to the drawings, FIG. 1 is a simplified diagram of an interline power flow controller 10 for controlling the power flow in two parallel transmission lines 12 and 14 of an electric power system. The power system includes a sending end bus 16 with voltage $v_s$ and a receiving bus 18 with a bus voltage $v_r$. Sending end bus 16 is connected to a first power source 20 and receiving end bus 18 is connected to a second power source 22. The two lines are characterized by their series reactive impedances $X_1$ and $X_2$ and they are assumed to conduct currents $i_1$ and $i_2$, respectively. The power circuit of the Interline Power Flow Controller (IPFC) includes a converter 24, which in this embodiment includes two voltage sourced inverters 26 and 28, connected back-to-back with a common DC link 30. The two inverters may employ gate turn-off thyristors, or other suitable power semiconductors, and they may use various well established techniques (e.g. harmonic neutralization or pulse-width modulation) for output waveform generation. The inverter structure of the IPFC, excluding its coupling to the ac system, may actually be identical to that described in U.S. Pat. No. 5,343,139 for the Generalized Fast Flow Power Controller. However, the circuit arrangement of the IPFC for coupling outputs of the two inverters to the ac system fundamentally differs from that used for the Generalized Fast Flow Power Controller. For the IPFC, the ac outputs of both inverters are coupled in series with the transmission lines. Specifically, the output of inverter 26 is coupled in series with line 12 and the output of inverter 28 is coupled in series with line 14 via insertion transformers Tr1 and Tr2, respectively. In the circuit arrangement of the Generalized Fast Flow Power Controller, as shown in U.S. Pat. No. 5,343,139, both inverters are coupled to the same line. Furthermore, whereas the output of one inverter is coupled to the line in a series connection, the other is coupled to the line in a parallel connection. Consequently, the Generalized Fast Flow Power Controller disclosed in U.S. Pat. No. 5,343,139 could not control directly the power flow in, and the power transfer between two (or more) lines of the power system, which are the main objectives of the present invention.

The two inverters 26 and 28 of FIG. 1 are operated by a control 32 so as to vary the transmittable power in each line by individual series reactive compensation as commanded by the two reactive compensating impedance reference signals $X_{C1}$ and $X_{C2}$, and the real power transfer between lines 12 and 14 as commanded by real power reference signal $P_{12}$. Signals representative of measured system variables, such as transmission line currents, are delivered to the control on lines $mv_1$, $mv_2$ and $mv_3$.

In FIG. 1, each inverter produces a controllable ac output voltage at the fundamental frequency of the ac power system. Each output voltage is coupled to an individual transmission line via a series insertion transformer. The output of each inverter is synchronized to the current of the particular transmission line it controls. The phase position of an inverter voltage with respect to the line current, as well as its magnitude, are adjusted so that the injected series line voltage will have an appropriate component that is in quadrature and another one that is in phase with the line current. The quadrature component will provide series reactive compensation for the line and the in-phase component will absorb from, or generate for, the line an amount of real power that is desired to be absorbed from, or generated for, this line. The real power (positive or negative depending on whether power is absorbed from an overloaded line or provided for an under loaded line) is transferred to the DC terminals of the inverter in question as power demand. The output voltage of another selected inverter (or the combination of inverters) controlling another line (or a number of lines) is adjusted so that the resultant in-phase component (or the sum of the in-phase components) results in an identical but opposite real power exchange to that demanded by the inverter which exchanges real power with the overloaded or under loaded line in question. In this way real power transfer between selected lines can be established via the inverters while each inverter keeps providing an independently controlled reactive compensation for the individual lines.

In FIG. 1, inverter 26 is synchronized to the current $i_1$ (lower case letters for currents and voltages indicate instantaneous values, whereas capital letters indicate r.m.s. values and phasors) flowing in line 12. That is to say, inverter 26 produces an alternating voltage $v_{pq1}$ at the fundamental power system frequency, the magnitude of which is controllable between zero and a maximum value determined by the rating of inverter 26, and the angular position of which, with respect to that of line current $i_1$, can be varied from zero to 360 degrees. This voltage, $v_{pq1}$, is inserted in series with line 12 via transformer Tr1.

Figure 2:
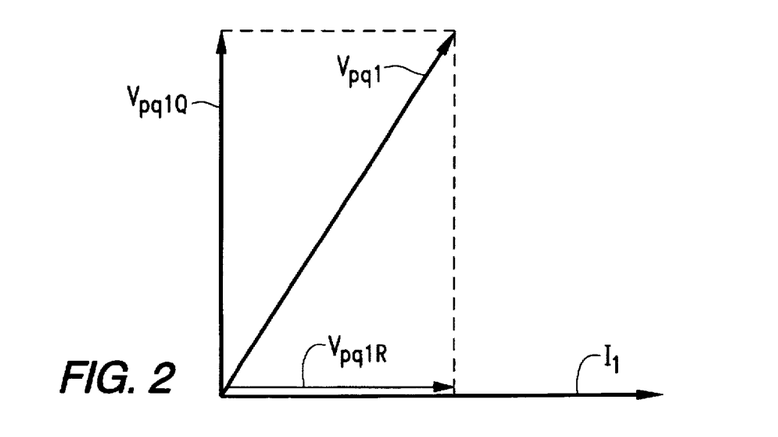
FIG. 2 is a vector diagram illustrating the operation of the interline power flow controller of FIG. 1.

The line current $i_1$ flows through series transformer Tr1 and interacts with the injected voltage $v_{pq1}$. The interaction means, in general, the exchange of both real and reactive power between line 12 and inverter 26. This power exchange is illustrated in FIG. 2 in the form of a phasor diagram. As seen in FIG. 2, the component of the voltage, $V_{pq1R}$, that is in phase with current $i_1$, results in real power $P_{12}=I_1V_{pq1R}$, and the component of voltage, $V_{pq1Q}$, that is in quadrature with current $I_1$, results in reactive power $Q_{C1}=I_1V_{pq1Q}$. It should be noted that the form of these equations implies single phase quantities. It is to be understood however, that although the IPFC concept could be applied to single-phase power systems, it in practice would normally be used in conjunction with three phase power systems. In spite of this, the equations are kept in the previously used simple form throughout this discussion with the understanding that they can be made to be also valid for balanced three-phase systems by assuming that they represent related phase quantities, e.g., line to neutral voltages and line currents, and by simply multiplying them by three.

As is known from the theory of voltage-sourced inverters, and as explained in the referenced U.S. Pat. No. 5,343,139, inverter 26 (as well as inverter 28) is able to generate or absorb the reactive power, $Q_{C1}$, exchanged. However, inverter 26 will convert real power $P_{12}$ and transfer it to its DC terminals, where it appears as a real power demand (positive or negative) to be provided in the form of $V_{DC}I_{DC}$, where $V_{DC}$ is the voltage of the common DC link and $I_{DC}$ is the current to be supplied or absorbed by the link.

The quantity $(1/I_1)V_{pq1Q}$ represents the virtual reactive impedance that the inverter produces to compensate the existing line impedance $X_1$, and thereby to increase or decrease the transmitted power. This compensating impedance may be capacitive (to increase the transmitted power) or inductive (to decrease the transmitted power), depending on whether the injected voltage $V_{pq1Q}$ lags or leads the line current by 90 degrees. If the compensating impedance is $X_{C1}$, where $X_{C1}=(1/I_1)V_{pq1Q}$, then the power transmitted through line 12 will be inversely proportional to the impedance difference given by $X_1-X_{C1}$. The $X_{C1}$ is a reference quantity provided for the IPFC control to adjust the power flow in line 12. The desired quadrature voltage to be injected by inverter 26 can be simply derived from this with the knowledge of the line current $I_1$, that is, $V_{pq1Q}=X_{C1}I_1$.

The quantity $(1/I_1)V_{pq1R}$ represents the virtual real impedance $R_1$ that the inverter produces. This impedance may be positive (in which case real power is absorbed from the line) or negative, in which case real power is generated for the line), depending on whether the injected voltage component $V_{pq1R}$ is in phase, or in phase opposition, with line current $I_1$. In the first case, real power $P_{12}=I_1V_{pq1R}=(I_1)^2R_1$, is absorbed from the line and transferred to the common DC terminals of inverters 26 and 28. In the second case, $P_{12}$ is absorbed by inverter 26 from common DC terminals and delivered for line 12 at its ac terminals. This case, from the viewpoint of line 12, is equivalent to that of an additional power generator with real power rating of $P_{12}$ connected in series with the sending end voltage source to increase the overall power input to line 12.

It is easy to see if inverter 28 of the IPFC is operated so as to inject in series with line 14 a virtual real impedance with an equivalent magnitude but with an opposite sign to that injected in series with line 12 by inverter 26, while also injecting an independently controllable virtual reactive impedance, then the real power $P_{12}$ will be transferred from either line 12 to line 14, or visa versa (depending on which of the two virtual real impedances is positive and which is negative), while both lines receive independently controlled series reactive compensation. In order to accomplish this, inverter 28 is synchronized to the current $i_2$ flowing in line 14. That is, inverter 28 produces an alternating voltage $v_{pq2}$ at the fundamental power system frequency, the magnitude of which is controllable between zero and a maximum value determined by the rating of inverter 28, and the angular position of which, with respect to that of current $i_2$, can be varied from zero to 360 degrees. This voltage, $v_{pq2}$, is inserted in series with line 14 via transformer Tr2.

The line current $i_2$ flows through series transformer Tr2 and interacts with the injected voltage $v_{pq2}$. The interaction means, as explained above, the exchange of both real and reactive power between line 14 and inverter 28. Specifically, the component of the voltage, $v_{pq2R}$, that is in phase with current $i_2$, defines the real power exchange, and voltage component, $v_{pq2Q}$, that is in quadrature with current $i_2$, defines the reactive exchange between line 14 and inverter 30. In order to satisfy the command to transfer real power between lines 12 and 14, via the common DC link 30 of the back-to-back connected inverters, the real power exchange between lines 14 and inverter 28 must be equal and opposite to that exchanged between line 12 and inverter 26. That is, $I_1V_{pq1R}+I_2V_{pq2R}=0$. The reactive power exchanged between line 14 and inverter 28, defined by $Q_{C2}=I_2V_{pq2Q}$ is independently controllable from that, $Q_{C1}=I_1V_{pq1Q}$, exchanged between line 12 and inverter 26. The quantity $(1/I_2)V_{pq2Q}$ represents the virtual reactive impedance that the inverter produces to compensate the existing line impedance $X_2$, thereby increasing or decreasing the transmitted real power in line 14. This compensating impedance, just like the virtual compensating impedance produced by inverter 26, may be capacitive to increase the transmitted power) or inductive (to decrease transmitted power), depending on whether the injected voltage $v_{pq2Q}$ lags or leads the line current by 90 degrees. If the compensating impedance is $X_{C2}$, where $X_2=(1/I_2)V_{pq2Q}$, then the power transmitted through line 14 will be inversely proportional to the impedance difference $X_{C22}-X_2$. The $X_{C22}$ is also a reference quantity provided for the IPFC control 32 to adjust the power flow in line 14. The desired quadrature voltage to be injected by inverter 28 can be simply derived from this with the knowledge of the line current $I_2$, that is, $V_{pq2Q}=X_{C2}I_2$.

Figure 3:
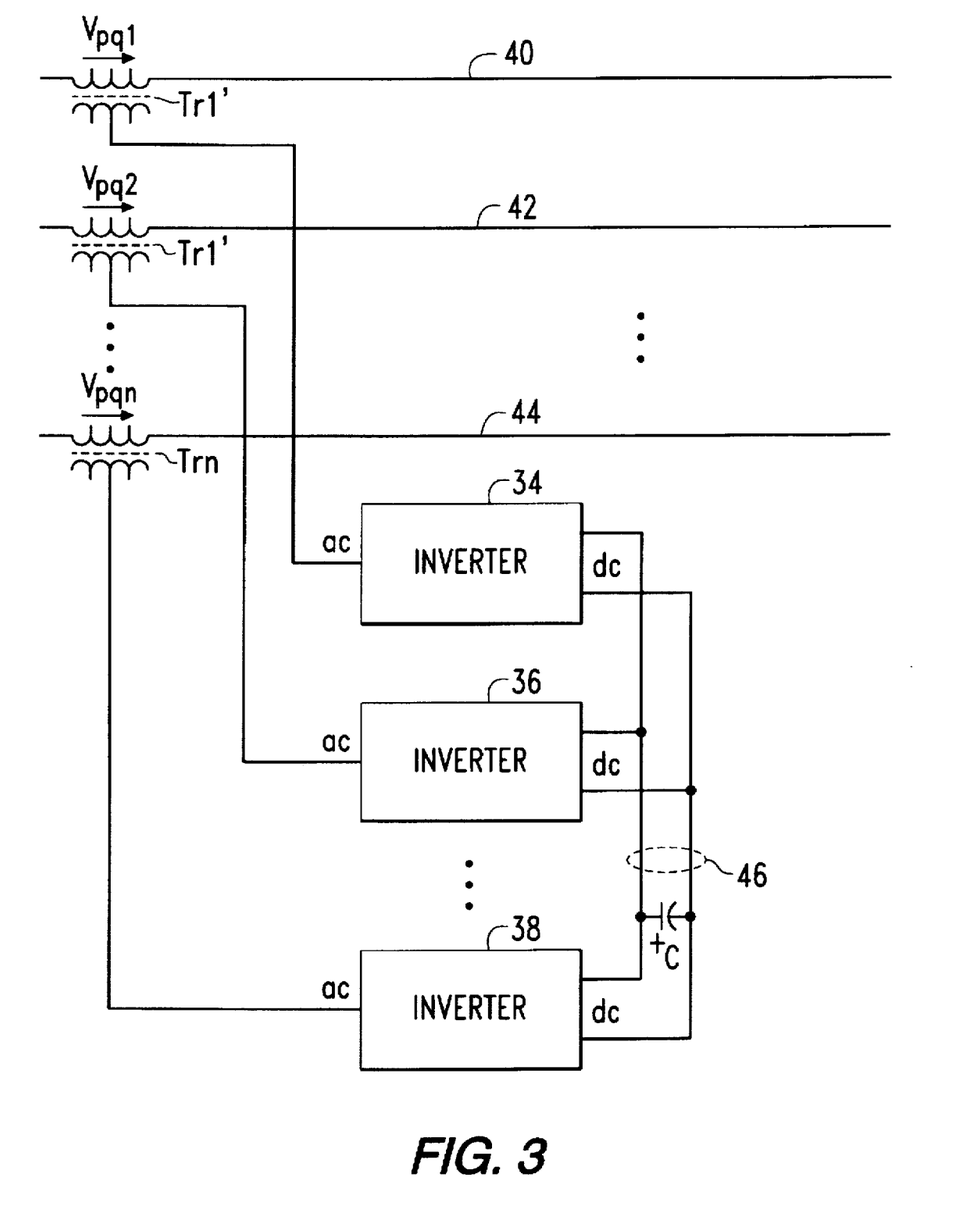
FIG. 3 is a simplified diagram of an interline power flow controller constructed in accordance with an alternative embodiment of the invention.

It can be appreciated that the embodiment of the IPFC shown above can be easily extended to multiple N (where N is an integer) lines as illustrated in FIG. 3. In FIG. 3, a plurality of N ac to DC inverters 34, 36 and 38 are coupled in series with transmission lines 40, 42 and 44, respectively, via transformers Tr1', Tr2' and Trn. A DC link 46 provides the common DC input voltage for the inverters. The necessary criterion for the operation of this system is that the sum of the real power exchanged by all inverters must sum to zero, $I_2V_{pq1R}+I_2V_{pq2R}+\ldots+I_nV_{pqnR}=0$. Otherwise, the ac voltage necessary for the operation of the inverters cannot be maintained. It should be understood, that the ac to DC inverters of FIG. 3 could be replaced by other types of power converters, for example, by ac to ac converters coupled by an ac link instead of a DC link, and still fall within this invention.

Figure 4:
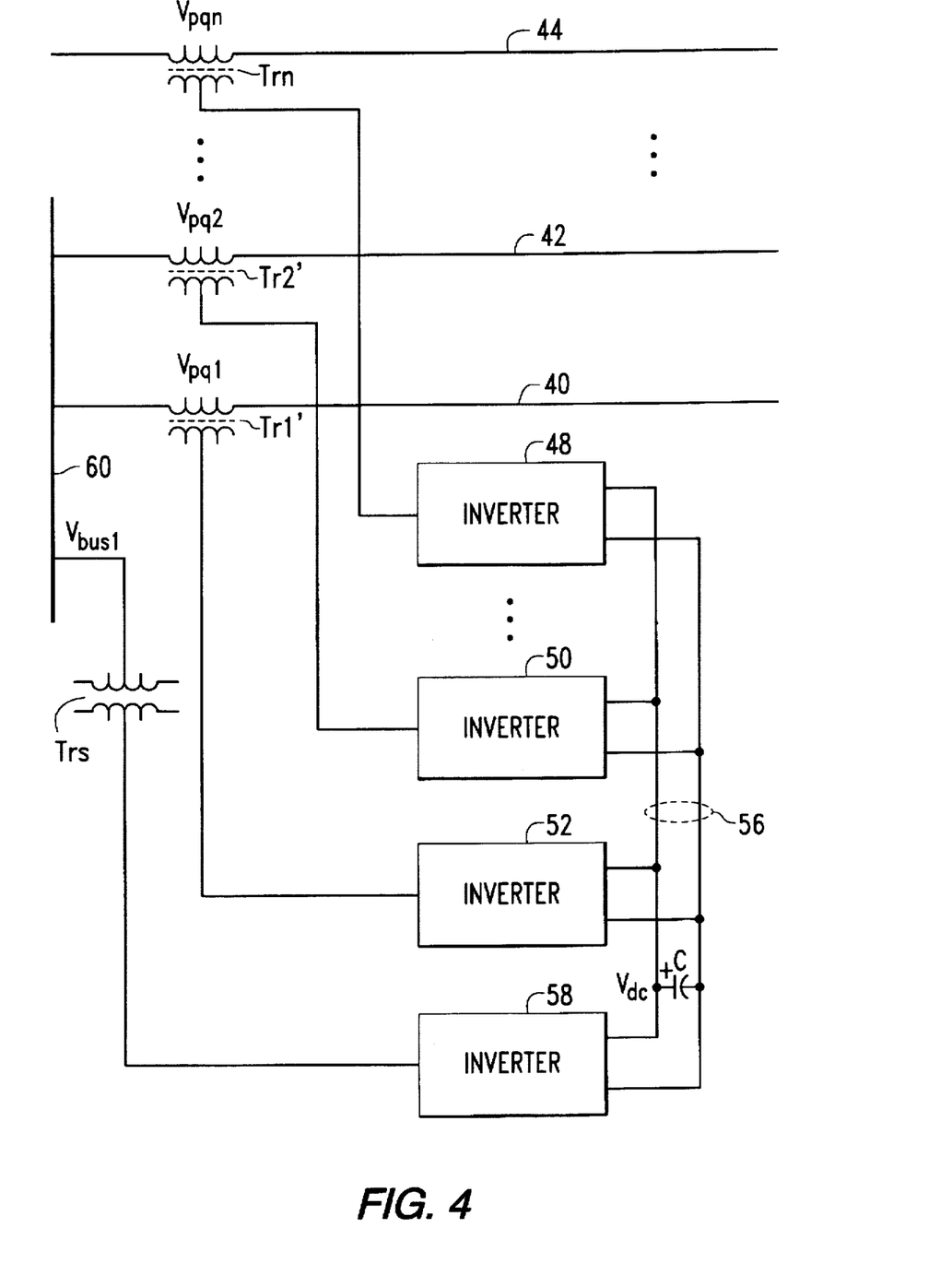
FIG. 4 is a simplified diagram of an interline power flow controller constructed in accordance with another alternative embodiment of the invention.

Another generalized arrangement for the IPFC is shown in FIG. 4. In this embodiment, N lines are compensated by N series inverters 48, 50 and 52 which are all connected to the DC bus 56. An additional inverter in the form of a shunt inverter 58 is also connected to the DC bus. The ac terminals of the shunt inverter are connected to an appropriate bus of the ac system by way of transformer Trs. FIG. 4 also shows a single ac bus 60 feeding two of the N transmission lines. Of course, the IPFC is not limited in any way by the bus arrangement of the transmission system. The line fed via series inverters could be fed individually or in groups from an arbitrary number of related and unrelated buses. The purpose of the shunt inverter is to remove the previously stated requirement that the real power exchanged by all series inverters must sum to zero. In this case, the sum of the real powers exchanged, that is, $I_2V_{pq1R}+I_2V_{pq2R}+\ldots+I_nV_{pqnR}=P_{diff}$, is recirculated to the common ac bus by the shunt inverter. In other words, the shunt inverter is controlled to maintain the desired DC terminal voltage, and in doing so, it exchanges $P_{diff}=V_{bus}I_{inv-real}$ power (positive or negative) with the ac bus. In the expression $V_{bus}I_{inv-real}$, $V_{bus}$ is the line to neutral voltage of the ac bus and $I_{inv-real}$ is the current component in phase with $V_{bus}$ drawn by the shunt inverter. The shunt inverter increases the degree of freedom in the compensation and power transfer control of individual lines, which makes this arrangement particularly suitable to manage power transfer in a complex transmission system involving several lines.

Figure 5:
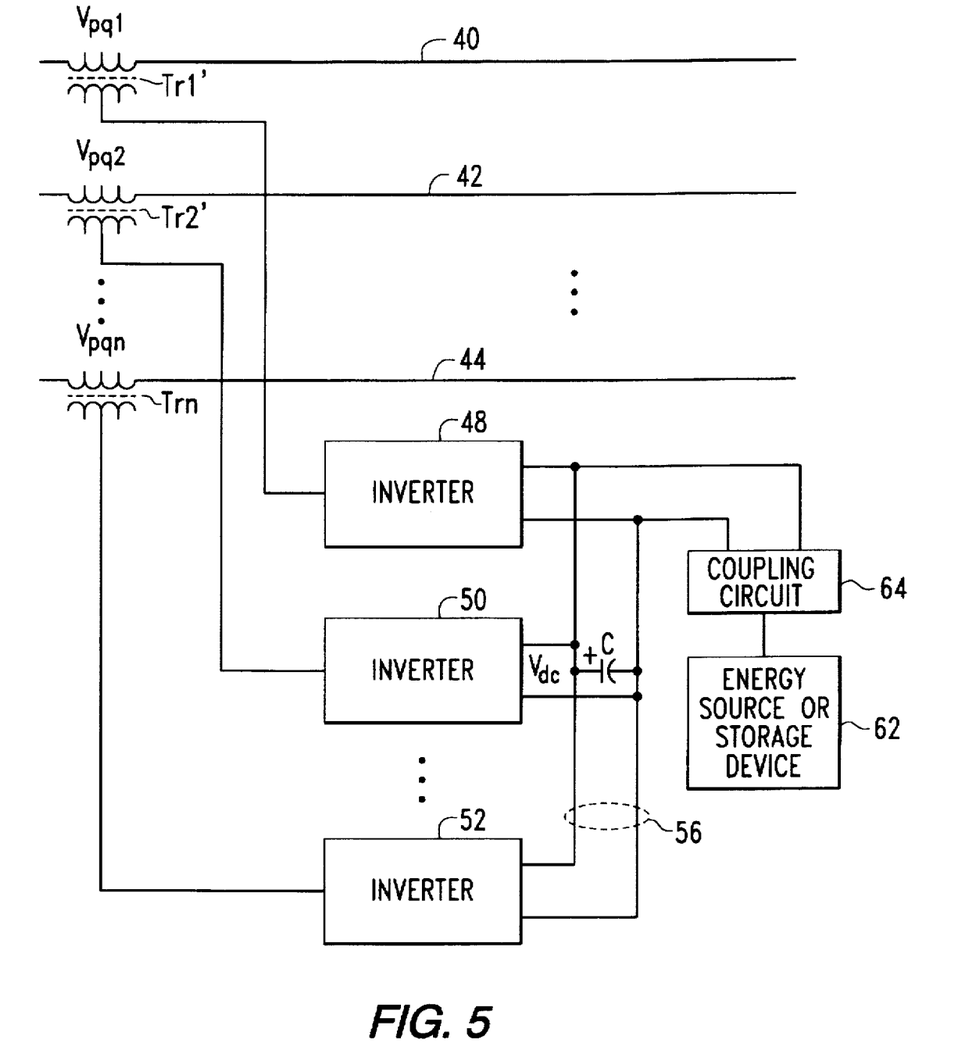
FIG. 5 is a simplified diagram of an interline power flow controller constructed in accordance with yet another alternative embodiment of the invention.

It should be evident to those skilled in the art that other implementations and applications of the invention are possible. For example, the IPFC could be implemented by the use of ac to DC current-sourced inverters, or by inverters operated with a resonant link, instead of the ac to DC voltage-sourced inverters shown in the FIG. 1 embodiment. Similarly, other types of power converters, such as ac to ac converters or frequency changers, could be employed to implement the IPFC. If an ac link is used, a passive resonant circuit can be coupled to the link. Also, the DC terminals of the IPFC inverters, used in the preferred embodiment could be coupled to an energy source or storage device 62 such as a large storage capacitor, battery bank, superconducting magnetic storage, etc., as shown in FIG. 5. Voltage-sourced type inverters would be used when the link has voltage-source type characteristics (e.g. the link is connected to a battery or capacitor bank), and current-sourced type inverters would be used when the link has current-source type characteristics (e.g. the link is connected to a rotating machine or inductive energy storage device). In the embodiment of FIG. 5, the energy storage device is coupled to the DC link 56 by way of a coupling circuit 64. This arrangement would allow short term violation of the condition of the real power exchange the real power exchanged by all inverters at zero, stipulated for the basic IPFC arrangement shown in FIG. 3. In this way, the IPFC could be used to counteract transient disturbances, such as voltage sags, power oscillation, subsynchronous oscillations, etc., in any one of the lines to which it is coupled, with the use of a single energy storage device rated to handle the disturbance only in one (or a defined number) line(s). One important application of the IPFC arrangement with an energy storage device is the dynamic compensation, or "restoration", of voltage sags occurring on electric power distribution system feeder lines.

With specific embodiments of the power circuit of the IPFC, and their various application features described above, it will be appreciated by those skilled in the art that further modifications and alterations, and additional applications to those described, could be developed in light of the overall teachings set forth above. Consequently, the arrangements described are meant to be illustrative only and not limiting as to the scope of the invention. For example, the energy source in FIG. 5 could be a rotating electrical machine.

Figure 6:
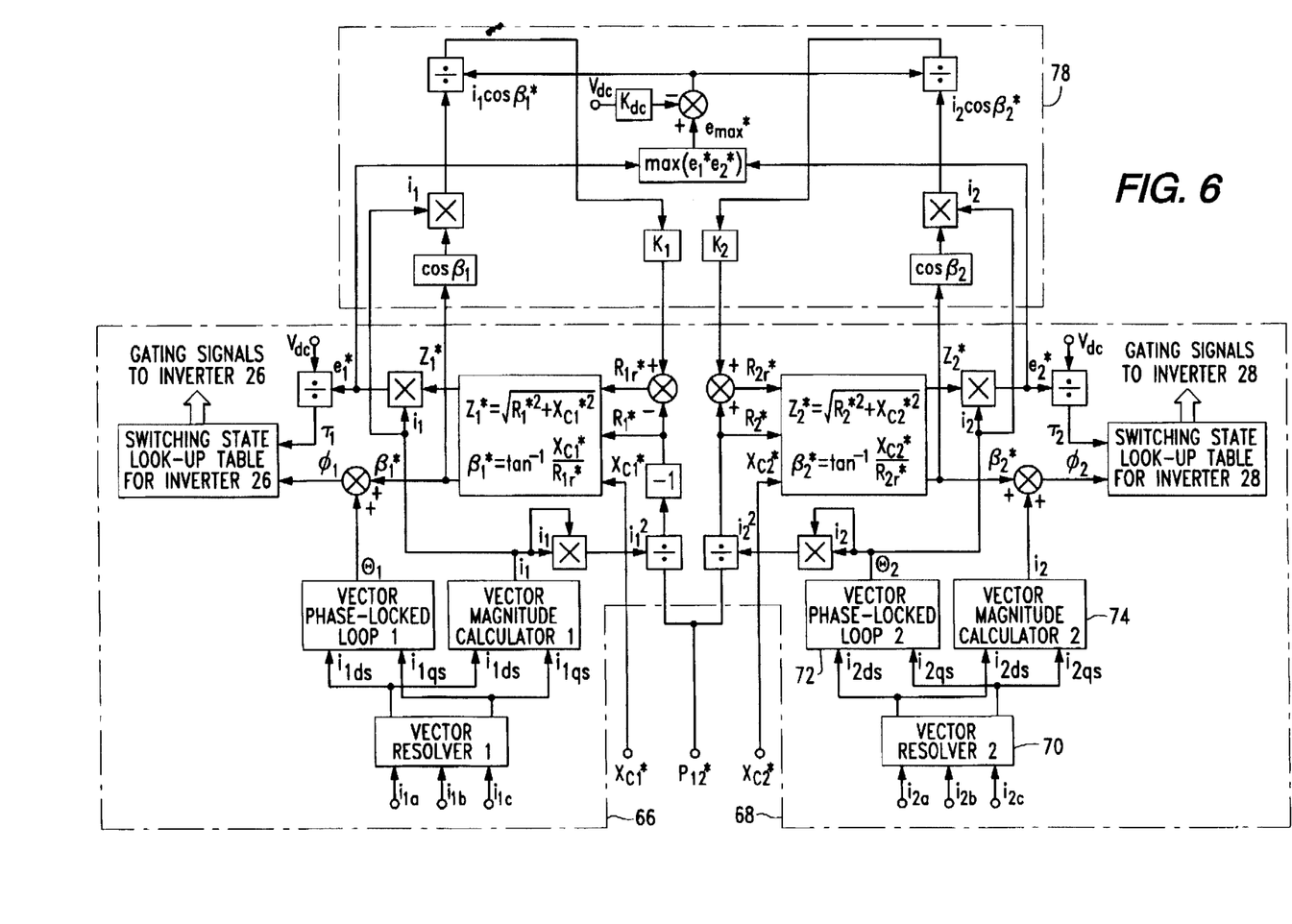
FIG. 6 is a simplified diagram of a control circuit for an interline power flow controller constructed in accordance with the invention.

The control system of the IPFC for the above example involving two transmission lines (such as in FIG. 1) is shown in FIG. 6. There are two essentially identical control units controlling inverters 26 and 28. Each unit is operated with an independent reactive impedance reference input (control unit 66 with $X_{C1}^*$ and control unit 68 with $X_{C2}^*$) to determine the degree of series reactive compensation for lines 12 and 14. The real power reference, $P_{12}^*$, which determines the real power to be transferred from one line to the other is common to the two control units, except for the polarity which is made opposite for control unit 66. In this way, a positive reference value for $P_{12}^*$ means that the real power transfer is from line 14 to line 12, and a negative reference value means that it is from line 12 to line 14.

The control units employ well established vector control techniques and functional blocks, such as are well explained in commonly owned application Ser. No. 08/366,646, filed Dec. 30, 1994, the disclosure of which is hereby incorporated by reference.

Referring now to FIG. 6, and in particular to control unit 68, this unit operates inverter 28 to inject a voltage $V_{pq\,2}$ in series with line 14. The magnitude and angle of $V_{pq2}$ must be such that the component, $V_{pq2R}$, in quadrature with transmission line current $i_2$, will represent a virtual reactive impedance, $X_{C2}=V_{pq2Q}/I_2$ defined by reference $X_{C22}^*$, and the component, $V_{pq2R}$, in phase with current $i_2$, will represent a virtual real impedance, $R_2=V_{pq2R}/I_2$ which gives real power $P_{12}=I_2^2 R_2$ defined by reference $P_{12}^*$.

Figure 7:
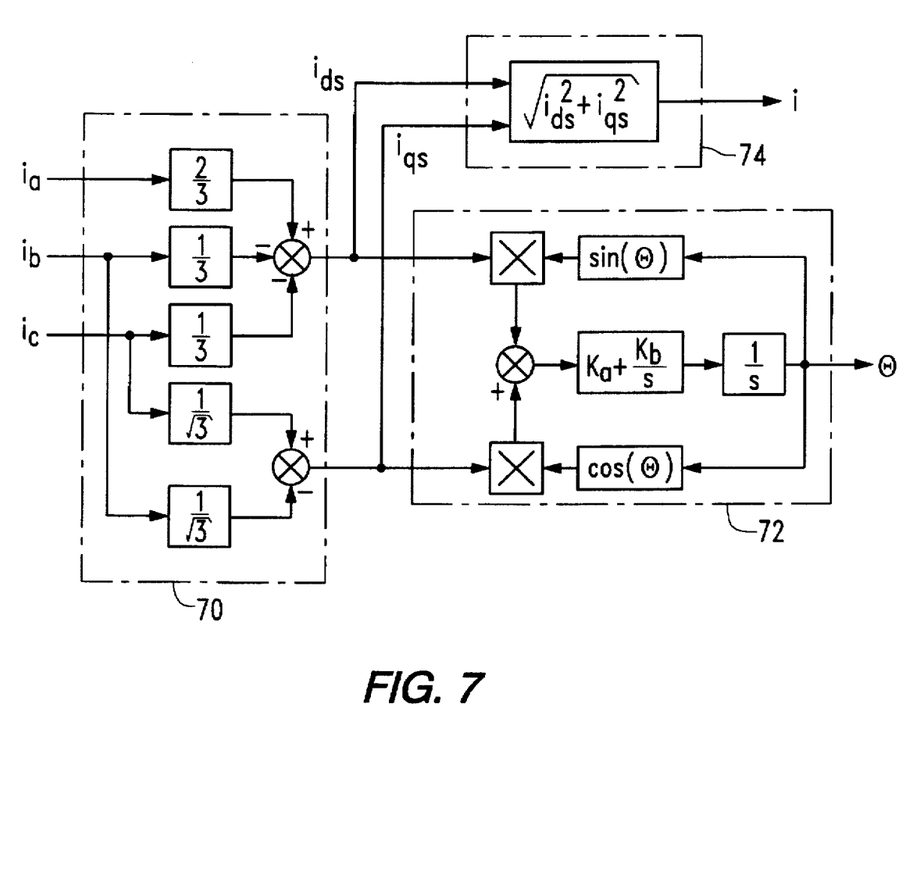
FIG. 7 is a block diagram of a portion of the control circuit of FIG. 6.

As the block diagram of control unit 68 shows, the instantaneous values of the three phase currents in line 14 are represented by a current vector in a two axes, d and q, system of coordinates. This current vector has an instantaneous magnitude $i_2$ and an instantaneous phase angle $\theta_2$. The derivation of these quantities are accomplished by three control blocks: vector resolver 70, vector phase locked loop 72 and vector magnitude calculator 74. The details of these control blocks are shown in FIG. 7 and their operation is well understood by those skilled in the art. Further explanation can be found in commonly assigned application Ser. No. 08/366,646.

The operation of inverter 28 is essentially determined by four variables: $X_{C2}^*$, $P_{12}^*$, $i_2$, and $\theta_2$. As seen in FIG. 6, the power reference is converted into an instantaneous real reference: $R_2^*=P_{12}^*/i_2$. From reference quantities $X_{C2}^*$, $R_2^*$, and from current magnitude $i_2$, the magnitude $e_2^*$ and angle $\beta_2^*$ of the desired series voltage vector with respect to the current vector of line 14 are derived by simple mathematical operation. Since angle $\beta_2^*$ defines the relative angular position of the desired series voltage vector, the total instantaneous phase angle of this voltages vector, and thus that of the voltage to be generated by inverter 28, is given by: $\phi_2=\theta_2+\beta_2^*$. The magnitude of the output voltage produced by inverter 28, is controlled by parameter $\tau_2$, defined as $e_2/V_{DC}$, where $e_2^*$ is the amplitude of the output voltage $V_{DC}$ is the voltage of the DC link. Thus, the ratio of the DC voltage to the magnitude of the desired series voltage $e_2^*/V_{DC}$ defines the instantaneous value of $\tau_2$, needed to operate inverter 28. Therefore, the quantities $\phi_2$ and $\tau_2$ can be used to operate inverter 28 via a look-up table of switch states that are sequentially stored for a defined set of $\tau_2$ value and can be accessed as a function of $\phi_2$.

As FIG. 6. shows, control unit 66 has the same structure and operates in the same way as control unit 68, deriving control variables $\phi_2$ and $\tau_2$ to provide gating signals for the switches of inverter 26. Note, however, that the sign of reference $R_1^*$, where $R_1^*=P_{12}^*/i_1^2$, is reversed (multiplied by-1) in order to ensure that that (positive) real power absorbed by inverter 28 from line 14 is delivered by inverter 26 to line 12 via the DC link.

Since $R_1^*$ represents the same power as $R_2^*$, and since its sign is opposite, theoretically, the two inverters should accommodate smooth power flow with stable DC link voltage. However, even small practical differences in the power circuit losses or control accuracies of the two inverters could result in small differences in the delicate real power balance, causing the DC link voltage to fluctuate or even collapse. In order to stabilize the DC link voltage a special power equalization control 78, in a closed-loop circuit arrangement, is employed. Referring again to FIG. 6, it is seen that reference inputs $R_2^*$ and $-R_1^*$ are modified by the addition of error signals $\Delta R_2$ to yield $R_{2r}^*$ and $\Delta R_1$ to yield $R_{1r}^*$, used to derive control angles $\beta_1^*$ and $\beta_2^*$. Error signals $\Delta R_1$ and $\Delta R_2$ are derived through the process which starts by comparison of the required magnitude signal $e_1^*$ and $e_2^*$ of the injected voltages $V_{pq1}$ and $V_{pq2}$, respectively, and selection of the larger one, $e_{max}^*$. This is accomplished by the function block max $(e_1^*e_2^*)$. The signal $e_{max}^*$ is then compared to the appropriately scaled $(k_{DC})$ value of the DC link voltage $V_{DC}$. The voltage error obtained is divided by $i_1\cos\beta_1^*$ and $i_2\cos\beta_2^*$ (the components of line currents $i_1$ and $i_2$ that are in phase with the injected voltages $V_{pq1}$ and $V_{pq2}$, respectively) to get a positive or negative real impedance difference indicating the need to increase, or the possibility to decrease, the DC voltage to facilitate the desired maximum line reactive compensation and real power transfer. The error, after appropriate amplification $(k_1\ k_2)$, are added to $-R_1^*$ and $R_2^*$ to produce $R_{1r}^*$ and $R_{2s}^*$ to change $\beta_1^*$ and $\beta_2^*$. It is seen that positive errors will increase $\beta_2^*$ and decrease $\beta_1^*$, to increase the DC link voltage, whereas negative errors will do the opposite to decrease it.

While specific embodiments of the invention have been described in detail, it will be appreciated by those skilled in the art that various modifications and alternatives to those details could be developed in light of the overall teachings of the invention. Accordingly, the particular arrangements disclosed are meant to be illustrative only and not limiting as to the scope of the invention which is to be given the full breadth of the appended claims and any and all equivalents thereof.

What is claimed:

1. A power flow controller for controlling the power flow in an electric transmission system including at least two transmission lines, each transmission line having two ends and carrying alternating current at a selected transmission line voltage and fundamental frequency between said ends, said controller comprising:

a converter for generating at least two alternating voltages at said fundamental frequency of said alternating currents flowing in said transmission lines with variable magnitude and controllable phase angle relative to said transmission line current;

means for coupling individually each alternating voltage generated by said converter in series with one of said transmission lines; and means for controlling the magnitude and phase of each alternating voltage generated by said converter, to adjust the effective reactive and real impedance of said each of said transmission lines and to control the real power transmitted between the two ends of said transmission lines.

2. The power flow controller of claim 1, wherein said means for controlling the magnitude and phase of each alternating voltage generated by said converter concurrently controls the amount of real power individually transferred between said transmission lines through said converter.

3. The power flow controller of claim 1, wherein said converter comprises at least two DC to ac inverters having DC terminals coupled through a DC link.

4. The power flow controller of claim 3, further comprising a power source connected to the DC link.

5. The power flow controller of claim 3, further comprising an energy storage means coupled to said DC link.

6. The power flow controller of claim 3, wherein each of said DC to ac inverters comprises a voltage-sourced type inverter, and said DC link has a substantially voltage-source type characteristics.

7. The power flow controller of claim 3, wherein each of said DC to ac inverters comprises a current-sourced type inverter, and said DC link has a substantially current-source type characteristics.

8. The power flow controller of claim 1, wherein said converter comprises at least two resonant inverter means having input terminals coupled through a resonant link means.

9. The power flow controller of claim 1, wherein said converter comprises at least one ac to ac converter.

10. The power flow controller of claim 1, wherein said converter comprises at least two ac to ac converters, each having a set of ac terminals coupled to an ac link.

11. The power flow controller of claim 10, further comprising an ac power source coupled to said ac link.

12. The power flow controller of claim 11, where said ac power source comprises a rotating electrical machine.

13. The power flow controller of claim 10, further comprising a passive resonant circuit coupled to said ac link.

14. A power flow controller for controlling the power flow in an electric transmission system including at least two transmission lines, each transmission line having two ends and carrying alternating current at a selected transmission line voltage and fundamental frequency between said ends, said controller comprising:

a first DC to ac inverter having ac terminals coupled in series with said first transmission line and having DC terminals;

a second DC to ac inverter having ac terminals coupled in series with said second transmission line and having DC terminals;

DC link means connecting the DC terminals of said first and second inverters;

first control means controlling the magnitude and phase angle of an alternating voltage generated by said first inverter at said fundamental frequency to a magnitude and an angle relative to said current flowing in said first transmission line in order to selectively adjust the effective reactive and real impedance of said first transmission line and thereby to control the real power transmitted between said two ends of said first transmission line and, concurrently, to inject a virtual real impedance in series with said first transmission line to control the real power transferred from said first transmission line by said first inverter to said DC terminals of said second inverter;

second control means controlling the magnitude and phase angle of an alternating voltage generated by said second inverter at said fundamental frequency to a magnitude and an angle relative to said current flowing in said second transmission line in order to selectively adjust the effective reactive impedance of said second transmission line and thereby to control the real power transmitted between said two ends of said second transmission line and, concurrently, to inject a virtual real impedance in series with said second transmission line with an equivalent magnitude and of opposite polarity to that injected by said first inverter in series with said first transmission line to transfer said real power said second inverter received at its DC terminals to said second transmission line; and power equalization control means to select the magnitude and polarity of said virtual real impedances injected by said first and second inverters in series with said first and second transmission lines to ensure the selected real power transfer between said first and second transmission lines.

15. A power flow controller for controlling the power flow in an electric power system comprising N transmission lines, each having two ends and carrying alternating current at a selected transmission voltage and fundamental frequency between said ends, said controller comprising:

N DC to ac inverters, each having ac terminals coupled in series with a selected one of the said N transmission lines and having DC terminals;

a DC link connecting the DC terminals of said N inverters;

N control means, each controlling, individually and in coordination, the magnitude and phase angle of the alternating voltage of one of the inverters at said fundamental frequency relative to said current flowing in the transmission line to which such inverter is coupled, in order to selectively adjust the effective reactive and real impedance of said selected transmission line to control the real power flow between said ends of said selected transmission line and, concurrently, to control the real power to be transferred between said selected transmission line and the remaining (N–1) transmission lines; and power equalization control means to select the magnitude and polarity of the virtual real impedance to be injected in series with said selected transmission line by each of the N inverters to ensure that selected real powers transferred between the N transmission lines sum to zero.

16. A power flow controller for controlling the power flow in an electric power system comprising N transmission lines, each having two ends and carrying alternating current at a selected transmission voltage and fundamental frequency between said sends, said controller comprising:

- an ac to DC power converter means having ac terminals connected in shunt with an ac power source and having DC terminals;
- N DC to ac inverters, each having ac terminals coupled in series with a selected one of the said N transmission lines and having DC terminals;
- DC link means connecting the DC terminals of said ac to DC converter and of said N DC to ac inverters;
- N inverter control means, each controlling, individually and in coordination, the magnitude and phase angle of the alternating voltage of one selected inverter at said fundamental frequency relative to said current flowing in the transmission line and said selected inverter being coupled to said selected transmission line in order to selectively adjust the effective reactive and real impedance of said selected transmission line to control the real power flow between said ends of said selected transmission line, the remaining (N−1) transmission lines and said ac power source; and
- converter control means controlling real power exchange between said ac power source and said ac to DC converter to supply real power to said N inverters and thereby enable the inverters to maintain selected power flows in said N transmission lines.

17. The power flow controller of claim 16, wherein said ac power source is provided by one or more transmission lines of said ac power system.

18. The power flow controller of claim 16, wherein said ac to DC converter is a voltage-sourced inverter.

19. A method for controlling the power flow in an electric transmission system including at least two transmission lines, each transmission line having two ends and carrying alternating current at a selected transmission line voltage and fundamental frequency between said ends, said method comprising the steps of:

- generating at least two alternating voltages at said fundamental frequency of said alternating currents flowing in said transmission lines with variable magnitude and controllable phase angle relative to said transmission line current;
- coupling individually each alternating voltage generated by said converter in series with one of said transmission lines; and
- controlling the magnitude and phase of each alternating voltage generated by said converter, to adjust the effective reactive and real impedance of said each of said transmission lines and to control the real power transmitted between the two ends of said transmission line.

20. The method of claim 19, wherein the step of controlling the magnitude and phase of each alternating voltage generated by said converter includes the step of controlling the amount of real power individually transferred between said transmission lines through said converter.

* * * * *